United States Patent [19]

Tsuyama

[11] 3,894,146
[45] July 8, 1975

[54] METHOD FOR PREVENTING OCCURRENCE OF DENTAL CARIES
[75] Inventor: Naoto Tsuyama, Okayama, Japan
[73] Assignee: Kabushiki-Kaisha Hayashibara Seibutsukagaku Kenkyujo, Okayama, Japan
[22] Filed: May 28, 1974
[21] Appl. No.: 474,091

[30] Foreign Application Priority Data
June 1, 1973  Japan................ 48-62337

[52] U.S. Cl.............. 424/49; 260/209 R; 424/180; 426/213
[51] Int. Cl............................................. A61k 7/16
[58] Field of Search ........................ 424/49–58, 424/180; 426/213; 260/209 R Primary Examiner—Richard L. Huff
Attorney, Agent, or Firm—Browdy and Neimark

[57] ABSTRACT

The present invention concerns with a method for preventing occurrrence of dental caries utilizing, as a sweetner for foods, drinks and dentrifrice, a starch syrup containing oligosaccharide as the main components on which molecular end fructose is bonded, namely oligoglucosyl fructose having the following formula;

$[O\text{-}\alpha\text{-}D\text{-glucopyranosyl-}(1 \rightarrow 4)]_n\text{-}O\text{-}\alpha\text{-}D\text{-glucopyranosyl-}(1 \rightarrow 2)\text{-}\beta\text{-}D\text{-fructofuranoside}$ which is produced by treating with glycosyltransferase a mixed solution of sucrose and oligosaccharide, which avoids the formation of dextran, levan etc. which could be produced by microbes in the mouth causing dental caries.

3 Claims, No Drawings

METHOD FOR PREVENTING OCCURRENCE OF DENTAL CARIES

The present invention relates to a sweetened composition for preventing dental caries and a process for the production thereof, wherein oligoglucosyl fructose mixture (hereinafter abbreviated as coupling sugar) is incorporated as sweetener in said composition and said oligoglucosyl fructose has the following formula;

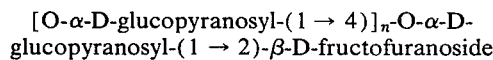

in which $n$ ranges from 1 to 15, the end of the oligoglucosyl saccharide is bound with fructose and said fructose and the adjacent glucose constitute sucrose.

At present, it is believed that dental caries are caused by polysaccharides and organic acids formed in the oral cavity, both of which are both results of sugar ingestion. In the case of sucrose, a typical sweetener, polysaccharides such as dextran, levan, etc. formed by microorganisms in oral cavity from said sucrose form a thin layer and accumulate on the tooth surface. Subsequently, various types of sugars which penetrated through the tooth surface are subjected to an anaerobic fermentation to form organic acids thereby eroding the enamel which is the surface tissue of the teeth. Since polysaccharides such as dextran, levan, etc. are generally produced from sucrose, it is evident that a habitual employment of sucrose causes dental caries.

As a result of an earnest search for sugars which prevent dental caries, the inventors discovered that the above mentioned coupling sugar is an excellent sweetener and accomplished the invention relating to a sweetened composition for preventing dental caries which comprises the incorporation of coupling sugar as sweetener and a process for producing thereof.

Coupling sugar is a sugar which comprises small amounts of oligoglucoside and sucrose, oligoglucosyl fructose being the main component, and is obtained by subjecting the mixed solution of sucrose and liquefied starch to an action of glycosyltransferase, produced from genus Bacillus, such as *Bacillus circulans* ATCC 61, 4530 and 9966, *Bacillus macerans* ATCC 7048, 7068, 7069, 8510, 8514 and 8515, IAM 1227 and 1243, *Bacillus megaterium* ATCC 21737, 21738 and 21739, *Bacillus stearothermophilus* FERM-P 2217, 2218, 2219, 2220, 2221, 2222, 2223, 2224 and 2225, and *Bacillus subtilis var amylosacchariticus* Fukumoto, etc., and concentrating or spray-drying the product after purifying by decolorization and deionization. The thus obtained coupling sugar is relatively undecomposable by saliva, whereas it is easily decomposed by intestinal invertase, amylase, etc.. Besides, coupling sugar has a mild sweetness and is suitable for imparting sweetness and body to food compositions. Since an habitual employment of the sweetened compositions of the present invention is effective in preventing multiplication of strains which produce polysaccharides such as dextran, levan, etc., fear of causing dental caries can be eliminated.

The sweetened compositions of the present application may be any composition in which coupling sugar is incorporated. They may be liquid, powder or solid, for example, sweetened dentifrice, gargle, sugar-coated tablets, table sugar, confectioneries, candies, foods and drinks, etc.. Preferably sweeteners used for these compositions should contain more than 50%, by weight, of coupling sugar, the remainder being at least one member of other sugars, sugar alcohols, artificial sweeteners, etc.. In addition, in view of the object of the present invention, a limited amount of free sucrose in coupling sugar is desirable.

The effectiveness of said coupling sugar will become more apparent from the following experiments.

EXPERIMENT 1

AN EXAMPLE OF PRODUCTION OF COUPLING SUGAR

A. Preparation of glycosyltransferase

*Bacillus megaterium* ATCC 21737 was innoculated in a liquid medium comprising 1.0% of wheat bran, 0.5% of corn steep liquor, 0.5% of dry yeast, 1.0% of polypeptone, 0.5% of casamino acid, 0.1% of urea, 0.2% of ammonium sulfate, 4.0% of soluble starch, 1.0% of calcium carbonate and tap water, and was subjected to submerged culture at 30°C for 2 days. The resultant broth was centrifuged to obtain the supernatant and the latter was used as glycosyltransferase solution. The activity, determined as dextrinogenic activity of starch, was 90 units per ml.

B. Reaction

A slurry comprising 60 parts of warm water and 20 parts of corn starch was liquefied to D.E. (Dextrose equivalent) 5.0 by heating to 88° to 90°C at pH 6.0 after adding thereto 0.2% by weight of starch of a commercialized thinning enzyme, and then the enzyme was deactivated by heating. After the resultant solution cooled down to 55°C, 20 parts of sucrose and 10 units of the enzyme solution prepared in (A) per gram starch were added thereto and the mixture was allowed to react at pH 6.0 and 50°C for 3 days. Then, the reaction solution was purified with active carbon and ion exchange resin to obtain coupling sugar syrup having a water content of 15% at a yield of 95% d.s.b.. The syrup was spray-dried to obtain white powder having a water content of 0.2%. An analysis of coupling sugar by paper chromatography showed that the rate of sucrose coupled with oligosaccharides was 59.5% to the total sucrose (i.e. sucrose coupled with oligosaccharides plus free sucrose).

EXPERIMENT 2

Decomposition of coupling sugar with various types of enzymes

When coupling sugar is decomposed, the sucrose fraction is released and becomes a substrate from which dextran will be formed. Therefore, the rates of reducing sugars vs. the total sugars and free sucrose vs. the total sucrose were calculated to obtain the decomposition degree. The decomposition was effected by using coupling sugar obtained in Experiment 1 having a concentration of 20% and excessive amount of enzyme at the optimum pH and temperature for each enzyme. The results are shown in the Table I.

Table 1

| Enzymes | Reducing sugar (as glucose) vs. the total sugars rate, % | Free sucrose vs. the total sucrose rate, % |
| --- | --- | --- |
| Glucoamylase (glucozyme)(amano Pharmaceutical Co., Ltd.) | 72.5 | 36.4 |

Table 1-Continued

| Enzymes | Reducing sugar (as glucose) vs. the total sugars rate, % | Free sucrose vs. the total sucrose rate, % |
|---|---|---|
| β-amylase (Nagase and Co., Ltd.) | 16.5 | 20.2 |
| Bacterial saccharogenic amylase (Ueda Industry Co., Ltd.) | 33.7 | 25.5 |
| Bacterial liquefying amylase (Neospitse) (Nagase and Co., Ltd.) | 9.13 | 17.0 |
| Saliva α-amylase of human | 19.1 | 18.5 |
| Invertase (BDH Chemical Ltd. pol, England) | 58.8 | trace |
| No addition | 5.03 | 17.0 |

Analysis
Total sugar : anthron method
Reducing sugar : Somogyi-Nelson method
Sucrose : after separation by paper chromatography, quantitatively determined with resorcinol reagent.

EXPERIMENT 3

Formation of polysaccharides

Leuconostoc mesenteroides NRRL B-512 and *Streptococcus mutans* 6715 were respectively cultivated in media containing either coupling sugar or the hydrolyzates thereof obtained in Experiment 2 and a control medium containig sucrose, and the resultants were determined on the amount of formed dextran. *Leuconostoc mesenteroides* was innoculated in a liquid medium comprising 10.0% of sugar, 0.5% of yeast extract, 0.25% of tryptone, 0.25% of $K_2HPO_4$, 1.0% of calcium carbonate and tap water, and was statically cultivated at 23° to 25°C for 2 days. Streptococcus mutans was innoculated in a liquid medium comprising 1.5% of trypticase, 0.5% of yeast extract, 0.02% of L-cysteine, 0.01% of $Na_2SO_3$, 0.1% of NaCl, 0.2% of $Na_2HPO_4$, 0.2% of $Na_2HPO_4$, 0.2 of $NaHCO_3$, 0.2% of sodium acetate, 5.0% of sugar and tap water, and was statically cultivated at 37°C for 7 days.

After completion of the cultivation, the cells were removed by filtration and to the filtrate ethanol was added to give an amount of 50% (v/v). The mixed solution was allowed to stand overnight to effect precipitation. The recovered precipitates were vacuum dried and the resultants were regarded as the amount of formed polysaccharides. The precipitates obtained by the addition of ethanol are high molecular polysaccharides which accumulate on the tooth surface.

The medium containing sucrose gave the broth with the highest viscosity and showed greater formation of dextran. The media containing either coupling sugar or the hydrolyzates thereof showed only a slight viscosity. The amounts of formed polysaccharides per 100g each sugar are shown in Table 2.

Table 2

| Hydrolyzates of coupling sugar | Leuconostoc mesenteroides NRRL B-512 | Streptococcus mutans 6715 |
|---|---|---|
| | Formed polysaccharides (g) | |
| Glucoamylase (glycozyme) (Amano Pharmaceutical Co., Ltd.) | 10.04 | — |
| β-amylase (Nagase and Co., Ltd.) | 0.65 | — |
| Bacterial saccharogenic amylase (Ueda Chemical Industry Co., Ltd.) | 1.05 | — |
| Bacterial liquefying amylase (Neospitase) (Nagase and Co., Ltd.) | 0.53 | — |
| Saliva α-amylase of human | 0.45 | 0.40 |
| Invertase (BDH Chemical Ltd., pool, England) | 0.07 | — |
| Sucrose | 22.03 | 3.41 |
| Coupling sugar | 0.63 | 0.42 |

Table 2-Continued

The above results offer proof that the formation of polysaccharides, i.e. high molecular dextran, which is the main constituent thereof, from coupling sugar and its saliva-α-amylase hydrolyzate is very little. Therefore, even if an organic-acid-producing strain is present, the produced organic acids will not effect dental caries due to the short of high molecular dextran.

EXPERIMENT 4

Formation of organic acids from coupling sugar

Coupling sugar obtained in Experiment 1 and its saliva-α-amylase hydrolyzate were compared with sucrose and glucose as controls on effecting formation of organic acids by oral microorganisms. 1% of each sugar was added to media of brain heart infusion (Difco Company, U.S.A.) and the mixtures was statically cultivated at 37°C for 20 hours. As a result, the pH values shown in Table 3 were obtained.

Table 3

| Sugars | pH |
|---|---|
| No addition | 6.5 |
| Coupling sugar | 6.2 |
| Saliva-α-amylase hydrolyzate of coupling sugar | 6.1 |
| Glucose | 4.3 |
| Sucrose | 4.0 |

In addition, after an expiration of 30 to 60 minutes following oral administration of each sugar, the pH values on the tooth surface were directly determined. Though the accurate values were difficult to obtain, it was evident that the pH value decreased after administering glucose. A decrease in pH value was not observed after administering coupling sugar.

EXPERIMENT 5

Caries test on rats

Rats, weighing about 100g, were divided into two groups of 20 each. To one group a sucrose-containing diet was administered and to the other group coupling sugar-containing diet. After 2 month feeding, the morbidity rates of caries of both groups were determined. The results are shown in Table 4.

Table 4

| Diet constitution | Sucrose-containing-diet-administered group | Coupling-sugar-containing-diet-administered group |
|---|---|---|
| Sucrose | 50 % | 0 % |
| Coupling sugar | 0 % | 50 % |

Table 4-Continued

| Diet constitution | Sucrose-containing-diet-administered group | | Coupling-sugar-containing-diet-administered group | |
|---|---|---|---|---|
| Corn starch | 33 | % | 33 | % |
| Casein | 10 | % | 10 | % |
| Soybean oil | 3.5 | % | 3.5 | % |
| Vitamins | 0.5 | % | 0.5 | % |
| Salts | 1 | % | 1 | % |
| Fibres | 2 | % | 2 | % |
| Morbidity rate of caries | 100 | % | 13 | % |

As is apparent from the above results, the morbidity rate of the coupling-sugar-administered group was only 13% and remarkably lower than that of the sucrose-diet-administered group. Accordingly, the facts that, due to little formation of dextran, coupling sugar is effective in preventing the accumulation of organic acids, which are formed by administering sucrose or glucose, on the tooth surface and that it produces less formation of organic acids are evidences that coupling sugar is an ideal sweetener for preventing dental caries.

Since carbohydrates which are present in common sweetened compositions form generally large amounts of glucose, sucrose or fructose by decomposition with saliva amylase, the presence of such carbohydrates is not a significant cause of dental caries. On the contrary, glucose, sucrose, fructose, etc. which are directly utilizable by microorganisms become the main cause for formation of organic acids in oral cavity. Therefore, the object for preventing dental caries can be sufficiently accomplished by the replacement of these sugars with coupling sugar.

Embodiments wherein the sweetened compositions of the present invention are used will be illustrated in the following example.

Coupling sugar is suitable for tooth powder or paste as the sweetener for preventing dental caries. The addition of 0.5 to 5.0% D.S. (D.S. represents dry substance) of coupling sugar imparts thereto a slight sweetness, moisture-conditioning and flavor-retaining properties. In the case of gargle, 5 to 20% of coupling sugar is added thereto and may be used by mixing with sufficient amounts of flavor and dye. As coupling sugar does not effect a side reaction and is stable for long periods, it can be incorporated in oral medicines, such as sugar-coated tablets, syrups, etc., as the sweetener for preventing dental caries and also is available as a vehicle for tablets.

Embodiments wherein coupling sugar is incorporated in foods and drinks will now be illustrated. Coupling sugar may be used as table sugar in powder or liquid from and, if desired for higher sweetness, may be used by mixing with a proper amount of artificial sweeteners, such as saccharin, dipeptide, etc.

Coupling sugar is suitable for drinks, such as fruit juice, lactic acid drinks, carbonated drinks, etc., not only as the sweetener for preventing dental caries, but also on account of imparting thereto a body, dispersing and flavor-stabilizing properties. The concentration of coupling sugar to be incorporated in drinks is different as the case may be, but the range of 1 to 20% is best.

Coupling sugar can be incorporated in confectioneries, for example frozen desserts or ice creams, as the sweetener for preventing dental caries and imparts a mild sweetness thereto. In addition, it is effective as a stabilizer because it does not cause a decrease in the melting point. Therefore, frozen desserts or ice creams of high qualities can be obtained by the use of coupling sugar. Coupling sugar is also suitable for sponge cakes, hot cakes, doughnuts, etc., because it prevents dental caries, is non-crystalline and is superior in moisture- and flavor-retaining properties to other sweeteners. The percentage of coupling sugar to be used in such products is 5 to 50% of total sugar and the employment of coupling sugar in a high concentration is effective in preventing multiplication of fungi.

Coupling sugar can be also incorporated into baked foods, such as breads, biscuits, cookies, etc., as the sweetener for preventing dental caries. As coupling sugar contains carbohydrates necessary for fermentation of such baked foods, products of high qualities can be obtained by the replacement of sucrose, glucose, etc. with coupling sugar.

Furthermore, coupling sugar can be incorporated in varies canned foods, such as fruits, vegetables, meat of animals or fishes, etc., and imparts a sweetness, a body and a gloss to the syrup of the canned foods. In addition, coupling sugar can prevent an abnormal sweeling following a generation of carbon dioxide by Strecker reaction and a coloring by Maillard reaction in canned fish meat.

Coupling sugar is also suitable for foods wherein large amounts of sweetness are incorporated, such as jelly, jam, marmalade, chewing gum, etc., on account of advantages such that it prevents dental caries, causes little Strecker reaction and Maillard reaction, and is non-crystalline. The percentage of coupling sugar to be incorporated in such products is open and sucrose, glucose, etc. which are conventionally used can be replaced with coupling sugar.

Similarly, sucrose, glucose, etc. which are conventionally used in foods wherein greater amounts of sweetness are incorporated such as sweetened condensed milk, hard candies, etc., can be replaced with coupling sugar, and the latter can prevent formations of dextran and organic acids and the resultant erosion on tooth surfaces. In particular, coupling sugar can prevent a crystallization of lactose in sweetened condensed milk and provides hard candies of high qualities which effect no crystallization.

The present invention will be illustrated by the following examples. (All parts and percentages are by weight unless stated otherwise)

EXAMPLE 1

Process for the production of tooth paste

A composition of tooth paste for preventing dental caries are as follows.

| | part(s) |
|---|---|
| Substance (magnesium carbonate) | 40 |
| Binder (Carboxymethylcellulose) | 50 |
| Sweetener (Coupling sugar) | 1 |
| Detergent | 1 |
| Flavor | 0.1 |
| Dye | 0.02 |

Carboxymethyl cellulose is admixed intimately with water and coupling sugar is added to the mixture, thereafter magnesium carbonate is admixed intimately therewith. Sufficient amounts of detergent, flavor and dye are admixed intimately with the resultant mixture.

In order to prevent aeration, vacuum-kneader use is prefered. The products are obtained by packing the uniformely mixed past in tubes.

Even if an excess of coupling sugar is used, it causes no harm. Accordingly, if desired for increased sweetness, a double amount may be used. Excess coupling sugar is effective as both binder sweetener for preventing dental caries.

EXAMPLE 2

Process for the production of moist dentifrice

A composition of moist dentifrice for preventing dental caries is as follows.

|  | part(s) |
|---|---|
| Substance (Powdered dicalcium phosphate.2H$_2$O) | 75 |
| Binder (methylcellulose) | 18 |
| Detergent | 1 |
| Sweetener (Coupling sugar) | 0.1 |
| Flavor | 0.1 |
| Dye | 0.01 |

Coupling sugar and methylcellulose mixed with a small amount of water, and then detergent, flavor and dye were added. Products were obtained by spraying the resultant mixture to powdered dicalcium phosphat . 2H$_2$O and mixing thoroughly.

The use of such dentifrices having coupling sugar as the sweetener can prevent formations of polysaccharides, such as dextran, etc., by microorganisms in the oral cavity and organic acids which erode tooth surfaces.

EXAMPLE 3

Process for the production of sweetened condensed milk and powdered milk

After adjusting the fat content of raw milk, the raw milk was purified through a clarifier. 4% coupling sugar which contains more than 50% oligoglucosyl fructose was added to the raw milk and the mixture was condensed at a reduced pressure to provide sweetened condensed milk having a solid content of 50%.

High water-soluble powdered milk can be obtained by spraying the above mentioned condensed milk using a spray nozzle and drying with hot air.

As such products have only a small content of glucose and sucrose, they scarcely cause the formation of polysaccharides by microorganisms or of organic acids from glucose, sucrose, etc. Accordingly, the frequent use of such products can eliminate a fear of dental caries.

EXAMPLE 4

Process for the production of powdered instant coffee

A coffee extract solution was prepared in partial vacuum at a concentration of 30%. Thereafter coupling sugar containing more than 50% oligoglucosyl fructose was added in an equivalent amount to the concentrated extract solid. The mixture was concentrated again at a partial vacuum to a concentration of 50% and then freeze-dried.

Coupling sugar imparts to the products a mild sweetness and body, and is effective in retaining the natural flavor of coffee. In addition, the frequent use of the products can eliminate a fear of dental caries.

EXAMPLE 5

Process for the production of breaks 100 parts of flour, 2 parts of bakery yeast, 5 parts D.S. of coupling sugar which contains more than 50% of oligoglucosyl fructose and 0.1 part of inorganic foods were mixed and kneaded while keeping the water content to less than 60%. The dough was allowed to fermentation at 26°C for 2 hours and then aged for 15 minutes of floor-time and 15 minutes of bench-time. Thereafter the dough was baked for 35 minutes.

As coupling sugar contains the necessary amount of glucose and sucrose for fermentation, the fermentation process proceeded smoothly. During the process, free glucose and sucrose contents are used up and oligoglucosyl fructose which has a mild sweetness remains in the products. Accordingly, the products are effective in preventing dental caries.

EXAMPLE 6

Process for the production of hard candies

In order to obtain hard candies for preventing dental caries, use sucrose and glucose should be avoided. Instead, coupling sugar which contains little sucrose and glucose was vacuum-concentrated to a water content of 13 to 14%, placed on a cooling pan. Then sufficient amounts of flavor and dye were added thereto without an addition of organic acids. The resulting products have a brittleness and are non-crystalline. As these substitutes contain little sucrose and glucose which cause the formation of organic acids, the regular use of these substitutes can eliminate a fear of dental caries.

EXAMPLE 7

Process for the production of sponge cake

Coupling sugar having a water content of 30% and small amounts of shortening oil and brandy were added to yolks of eggs, and the mixture was beated with a beater. Sifted flour was then quickly added thereto to form a dough, which was poured into a pan and baked in an oven at about 300°C for 40 minutes. Thereafter butter cream was added. Amounts of flour, sweetener and eggs may be in any proportion similar to that of the usual method.

The inside of the resultant products are uniform, the baking color is good and the sweetness is mild. In addition, as the products contain little amount of glucose, sucrose, etc., they are suitable foods for preventing dental caries.

EXAMPLE 8

Process for the production of lactic acid drinks 100 ml of skim milk was sterilized by heating at 80°C and then 3 litres of a culture broth of Lactobacillus bulgaricus as starter was added thereto. The mixture was allowed fermentation at 35° to 37°C for 10 hours to give a final acidity of 1.4. Subsequently, the mixture was homogenized with agitation so that the casein content was dispersed sufficiently. Then, 200 parts of coupling sugar having a water content of 25% was added thereto, dissolved and sterilized with agitation at 80° to 85°C. The product was cooled, a small amount of flavor was added and then the final product bottled.

Though present lactic acid drinks are acidified by lactic acid, they are popular drinks which contain little glucose and sucrose and give a mild sweetness. In addi-

EXAMPLE 9

Process for the production of canned fruit

Ripe yellow peaches peeled by usual methods were immersed in a 0.05% erythrosime solution for 15 minutes to colorize the sarcocarps and evacuated from the insides of the sarcocarps. During the process, the pH of the solution was adjusted to 4.0. Then the sarcocarps were washed with cold water to remove therefrom excessive days. Subsequently, the sarcocarps were immersed in coupling sugar solutions of 30% and then 50% to allow permeation of sweetness. Thereafter, the sarcocarps were packed in tin cans and 30% coupling sugar solution was added thereto. The cans were evacuated, seamed and then sterilized at 100°C.

According to the present invention which does not use glucose, sucrose, etc., canned products of high qualities which have an mild sweetness and a sufficient viscosity and gloss can be obtained. The products is also effective in preventing dental caries.

EXAMPLE 10

Process for production of chewing gum

According to usual method, 20 parts of gum base was dissolved by heating, and then 80 parts of coupling sugar and sufficient amounts of flavor and dye were added thereto. Then the mixture was kneaded with a roller-type kneader, shaped as required and allowed to drying overnight.

Though chewing gum is a confectionery which remains in mouth for a long time, the sweetness of the present products can be sufficiently maintained. Moreover, as the products cause little formation of organic acids on account of containing little glucose, sucrose, etc., they are also foods for preventing dental caries.

EXAMPLE 11

Process for the production of caramel 2 parts of flour was admixed with 100 parts of coupling sugar, with a water content of 20% and less than 5% glucose, and after gelatinizing the flour by heating, the mixture was boiled. 4 parts fats and oils and 9 parts peanut butter were added thereto at 115°C to emulsify the mixture and the product was further boiled at 120° to 125°C. After flavor was added thereto, the product was molded, cut and packed.

The products have a mild sweetness and are non-crystalline. In addition, as the products, in contrast with usual starch syrups, contain little glucose, they cause little formation of organic acids even if they remain in the oral cavity and accumulate on tooth surfaces. Accordingly, they do not become a cause of dental caries.

EXAMPLE 12

Process for the production of sweet chocolate

A mixture comprising 40 parts cacao paste, 10 parts cacao butter and 50 parts coupling sugar (fine powder) which contains less than 10% of glucose and sucrose was passed through a refiner. After reducing the viscosity, the mixture was placed in a conche where it was kneaded for 2 to 3 days. During the procedure, 0.5 parts of lecitin was added thereto and dispersed sufficiently. Thereafter, the temperature was adjusted to 31°C and, before solidification of butter, the mixture was shaped by casting. After evacuating with vibration, the product was passed into a cooling chamber kept at 10°C for 20 minutes to solidify the products.

The chocolate products have beneficial properties such as good appearance, smooth texture, mild sweetness, sufficient bitterness and natural solubility in mouth. In addition, as the products contain little amount of glucose, sucrose, etc., which become a cause for dental caries, they can eliminate a fear of dental caries.

EXAMPLE 13

Process for the production of powdered juice 40 parts of powdered coupling sugar, 0.2 part of citric acid, 0.35 parts of essence and a sufficient amount of dye were mixed and then dried.

The resultant products have a high water-solubility and a refreshing sweetness. In addition, the products can eliminate a fear of dental caries because they contain little organic acids.

EXAMPLE 14

Process for the production of carbonated drink

Cola drinks are suitable carbonated drinks for incorporating coupling sugar. The composition is as follows.
A. Cola flavor
  36 ml of lemon oil, 2.4 ml of sweet orange oil, 1.2 ml of nutmeg oil, 1.2 ml of cinnamon oil, 0.6 ml of coriander oil, 1.2 ml of neroli oil and 950 ml of alcohol having a concentration of 95%.
B. Cola syrup
  33 kg of coupling sugar having a water content of 20%, 19 l of water, 1,200 ml of caramel, 90 ml of phosphoric acid syrup, 37.5 g of caffein, 45 ml of coca leaf extract, 75 ml of cola fruit extract, 470 ml of alcohol, 150 ml of vanilla extract, 120 ml of glycerin, 480 ml of lime juice and 120 ml of cola flavor.

First, coupling sugar was dissolved in warm water and caramel was added. After cooling the mixture, other materials, such as phosphoric acid syrup, caffein, etc., were added and the mixture was allowed to age for 3 to 4 days. The aged solution was transferred into a bottle and the bottle was sealed after charging sufficiently cooled carbonated water.

As the products contain little glucose, sucrose, etc., they are effective in preventing dental caries.

What I claim is:

1. In a mouth-treatment composition containing a sweetener, the improvement wherein the sweetener contains oligoglucosyl fructose, whereby fewer dental caries will occur after use.

2. The improvement according to claim 1, wherein the mouth-treatment composition is a dentrifice.

3. The improvement according to claim 1, wherein the mouth-treatment composition is a mouthwash.

* * * * *

UNITED STATES PATENT OFFICE
CERTIFICATE OF CORRECTION

PATENT NO. : 3,894,146
DATED : July 8, 1975
INVENTOR(S) : Naoto STUYAMA

It is certified that error appears in the above-identified patent and that said Letters Patent are hereby corrected as shown below:

[73] Assignee: Kabushiki-Kaisha Hayashibara Seibutsu-Kagaku Kenkyujo

In the abstract, lines 3-4, "components" should read --component--

Column 6, line 17, "varies" should read --various--

Signed and Sealed this fourth Day of November 1975

[SEAL]

Attest:

RUTH C. MASON
Attesting Officer

C. MARSHALL DANN
Commissioner of Patents and Trademarks